Patented Sept. 19, 1950

2,522,488

UNITED STATES PATENT OFFICE 2,522,488

WATER-SOLUBLE SALT OF 2-4 DICHLOROPHENOXY ACETIC ACID AND METHOD OF PRODUCING SAME

Frederick C. Bersworth, Verona, N. J.

No Drawing. Application December 18, 1948,
Serial No. 66,142

4 Claims. (Cl. 260—501)

This invention relates to chemical compounds and more particularly to compounds of 2-4 dichlorophenoxy-acetic acid and has for its object the provision of a compound of this acid which has a high solubility in water and which is non-reactive with and stable in water containing water-hardening and other metal salts and compounds.

Another object is to provide a water-soluble 2-4 dichlorophenoxy-acetic acid compound which is non-precipitatable by water-hardening and other metal salts and compounds.

A further object is to provide a highly reactive weed killer compound of 2-4 dichlorophenoxy-acetic acid.

Other objects and advantages will be apparent as the invention is more fully hereinafter disclosed.

In accordance with these objects I have discovered that by reacting the normally insoluble 2-4 dichlorophenoxy-acetic acid, known generally as 2-4D, with the tetra-alkali metal salt of ethylene diamine tetra-acetic acid in aqueous solution, in the relative amounts approximating one molar weight of the tetra-salt to more than one molar weight of the acid but not over two molar weights of the acid, an alkali metal salt complex or double compound of the 2-4D acid and the amino acid is formed which has a solubility in cold water which is about three times that of the alkali metal salt of either constituent and which may be repeatedly recrystallized from hot aqueous solutions. The double salt or complex of the two acids moreover is non-reactive with water-hardening and metal salts present in water used to dissolve the double salt, greatly extending the field of utility and the efficiency of the 2-4D acid in its use as a weed-killer.

Heretofore in the art, while the water soluble salts of the 2-4D acid are known to be active as weed-killer agents, the use of such salts has been complicated by the circumstance that very few salts having any great solubility in water are known and that when these salts are dissolved in water containing water-hardening and other metal salts or compounds, insoluble 2-4D salts are invariably precipitated. The suspension of such insoluble salts of the 2-4D acid is not only difficult to spray uniformly over a surface area but the weed-killing activity of the 2-4D acid is directly dependent upon its solubility and upon the readiness with which the plant can take it in through its leaves or by its root system.

The double alkali metal salt complex of the 2-4D acid and the amino acid of the present invention is highly soluble in water and is non-reactive with water-hardening and other metal salts and accordingly may be utilized under widely varying agriculture conditions. This high solubility and chemical non-reactivity of the compound of the present invention permits its use in lesser concentration than any other 2-4D salt heretofore known to obtain quicker and better weed-killing results in all types and kinds of water and soils.

As one example of the manufacture of this alkali metal double salt complex of the 2-4D acid and ethylene diamine tetra acid, one molar weight of the 2-4D acid is dissolved in an aqueous solution of the tetra sodium salt of ethylene diamine tetra-acetic acid containing one molar weight of the said tetra sodium salt. The amount of water present in the solution may be varied widely without essential departure from the invention but should be at least sufficient to provide a clear solution at temperatures approximating the boiling point of the solution. After this molar weight of the 2-4D acid has been dissolved in the solution a sufficient amount of the 2-4D acid is added to the solution to bring the pH of the solution to about 7. This normally requires from 1/3 to 2/3 molar weights more of the 2-4D acid depending upon the amount of free alkali present in the tetra-salt, which may vary somewhat.

The resulting aqueous solution is then evaporated until the major portion of the water present has been removed and then is cooled to a low temperature to crystallize out the double salt product. The crystalline double salt complex is readily separated from the mother liquor by filtration and is a white crystalline product soluble in cold water to about 10% and in hot water at about 100° C. to about 25% solution.

The double salt complex in aqueous solution is non-reactive with heavy metal ions and with alkaline earth metal and magnesium ions to form insoluble 2-4D salts and is believed to be essentially a partially neutralized complex compound of the two acids wherein the 2-4D acid is held to the amino nitrogens of the amino acid by the residual valencies of the normally pentavalent nitrogen released upon solubilizing the amino acid through salt formation. However, there is a possibility that the 2-4D acid forms an acid adduct compound with the partially neutralized amino acid.

The double salt complex is quite stable in aqueous solutions through a wide range in pH, from a pH as low as 6 to about 8. Solutions having a pH above about 8 or below about 6 are not desirable for use as spray solutions as the free alkali or free acid present normally can be expected to injure vegetation.

As an alternative practice, a mixture of the 2-4D acid and the amino acid consisting of about 1.5 molar weights of the 2-4D acid to 1 molar weight of the amino acid may be suspended in water and dissolved therein by the gradual addition thereto of about 4 molar weights of NaOH, with heating to the boiling point of the solution and continued stirring. Conversely, the mixture of 2-4D acid and amino acid may be slowly added to a solution of the NaOH heated to its boiling point.

Where there are no impurities present in the 2-4D acid, amino acid and NaOH, the aqueous solution of the double salt may be evaporated to dryness, if desired, instead of recovering the double salt complex product by crystallization as first described.

Another alternative way of producing the double salt complex is to add the alkali metal salt of the 2-4D acid to an aqueous solution of the amino acid and alkali metal hydroxide containing more than 2 but less than 3 molar weights of the alkali metal hydroxide for each molar weight of the amino acid. To this solution not over 1½ molar weights of the alkali metal salt of the 2-4D acid should be added and the pH of the solution should be adjusted to a pH of about 7 by additions of 2-4D acid or free alkali, as the circumstances require.

As a specific example of the increased utility of the double salt complex of the present invention over those heretofore available, the double salt complex is freely soluble in the cold in water of average hardness and of average metal ion content to form clear solutions containing from 1% to about 10% of the double salt complex. The most soluble of the water soluble salts of the 2-4D acid heretofore employed have a solubility of 3–4% in pure water and react with water-hardening and heavy metal salts to form insoluble 2-4D compounds which when sprayed onto the plants are with difficulty and great slowness taken up by the plants.

To the contrary the water-soluble salt complex of the present invention appears to have greater wetting power than the other water-soluble salts of 2-4D in pure water and to be immediately available for its weed destroying action whether on the plant leaves or in the soil.

In substitution for ethylene diamine tetra-acetic acid I may employ propylene diamine tetra-acetic acid, trimethyline diamine tetra-acetic acid, and similar homologous polyamino polyacetic acids, without essential departure from the invention, to form substantially equivalent double salt complexes of the 2-4D acid, and the term ethylene diamine tetra-acetic acid as it hereinafter appears in the claims includes these equivalent amino acids.

Having hereinabove described the present invention generically and specifically and given several specific examples of the same, it is believed apparent that the same may be widely varied without essential departure therefrom and all such modifications and departures are contemplated as may fall within the scope of the following claims.

What I claim is:

1. The chemical compound consisting of a double alkali metal salt complex of 2-4 dichlorophenoxy acetic acid and ethylene diamine tetra-acetic acid, said salt complex having a pH in aqueous solution of about 7.

2. The chemical compound consisting of the double sodium salt complex of 2-4 dichlorophenoxy acetic acid and ethylene diamine tetra-acetic acid, said salt complex having a pH in aqueous solution approximating 7.

3. The method of forming the compound of claim 1, which comprises bringing into reactive contact in water, ethylene diamine tetra-acetic acid, 2-4 dichlorophenoxy acetic acid, and an alkali metal hydroxide, in the relative proportions of one molar weight of the tetra-acetic acid to four molar weights of the alkali metal hydroxide and an amount of the phenoxy acid which is more than one but less than two molar weights thereof, sufficient to provide a pH within the range 6 to 8 to the solution, and removing the water of solution to recover the said compound therefrom.

4. The method of claim 3, wherein the water of solution is removed in greater part only and sufficiently to recover the compound by crystallization therefrom.

FREDERICK C. BERSWORTH.

REFERENCES CITED

The following references are of record in the file of this patent:

UNITED STATES PATENTS

| Number | Name | Date |
|---|---|---|
| 2,396,513 | Jones | Mar. 12, 1946 |

OTHER REFERENCES

"Hackh's Chemical Dictionary," by Grant, 3d ed., Blakiston Publishing Co., pages 286–287.